US007853042B2

United States Patent
Parameswaran et al.

(10) Patent No.: US 7,853,042 B2
(45) Date of Patent: Dec. 14, 2010

(54) TUNABLE KERNELS FOR TRACKING

(75) Inventors: Vasudev Parameswaran, Dayton, NJ (US); Visvanathan Ramesh, Plainsboro, NJ (US); Imad Zoghlami, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 1011 days.

(21) Appl. No.: 11/650,788

(22) Filed: Jan. 8, 2007

(65) Prior Publication Data

US 2007/0183630 A1 Aug. 9, 2007

Related U.S. Application Data

(60) Provisional application No. 60/758,243, filed on Jan. 11, 2006.

(51) Int. Cl.
G06T 7/20 (2006.01)
(52) U.S. Cl. ...................................... 382/103; 348/169
(58) Field of Classification Search ................. 382/103, 382/107; 348/169–172
See application file for complete search history.

(56) References Cited

U.S. PATENT DOCUMENTS 7,397,948 B1 * 7/2008 Cohen et al. ................. 382/167
7,418,113 B2 * 8/2008 Porikli et al. ............... 382/103
2003/0068082 A1 * 4/2003 Comaniciu et al. .......... 382/162

OTHER PUBLICATIONS

Veeraraghavan et al. "Combining Multiple Tracking Modalities for Vehicle Tracking at Traffic Intersections." Proceedings of the 2004 IEEE International Conference on Robotics and Automation, Apr. 2004, pp. 2303-2308.*
Porikli et al. "Multi-kernel Object Tracking." 2005 IEEE International Conference on Multimedia and Expo, Jul. 6, 2005, pp. 1234-1237.*
Hager et al. "Multiple Kernel Tracking with SSD." Proceedings of the 2004 IEEE Computer Society Conference on Computer Vision and Pattern Recognition, Jun. 27, 2004, vol. 1, pp. I-790-I-797.*
Babu et al. "Robust Tracking with Motion Estimation and Kernel-based Color Modelling." 2005 IEEE International Conference on Image Processing, Sep. 11, 2005, vol. 1, pp. 717-720.*
Park et al. "Object Tracking in MPEG Compressed Video Using Mean-Shift Algorithm." Proceedings of the 2003 Joint Conference of the Fourth International Conference on Information, Communications and Signal Processing, Dec. 15, 2003, vol. 2, pp. 748-752.*

(Continued)

Primary Examiner—Jon Chang
(74) Attorney, Agent, or Firm—Donald B. Paschburg

(57) ABSTRACT

A tunable representation for tracking that simultaneously encodes appearance and geometry in a manner that enables the use of mean-shift iterations for tracking is provided. The solution to the tracking problem is articulated into a method that encodes the spatial configuration of features along with their density and yet retains robustness to spatial deformations and feature density variations. The method of encoding of spatial configuration is provided using a set of kernels whose parameters can be optimized for a given class of objects off-line. The method enables the use of mean-shift iterations and runs in real-time. Better tracking results by the novel tracking method as compared to the original mean-shift tracker are demonstrated.

20 Claims, 10 Drawing Sheets

OTHER PUBLICATIONS

Mittal et al. "Motion-based Background Subtraction Using Adaptive Kernel Density Estimation." Proceedings of the 2004 IEEE Computer Society Conference on Computer Vision and Pattern Recognition, Jun. 27, 2004, vol. 2, pp. II-302-II-309.*

S. Birchfield and S. Rangarajan, "Spatiograms versus histograms for region-based tracking," *Proc. IEEE Conf. on Computer Vision and Pattern Recognition*, 2005.

R. Collins, "Mean-shift blob tracking through scale space", in *Proc. IEEE Conf. on Computer Vision and Pattern Recognition*, 2003.

D. Comaniciu, "An algorithm for data-driven bandwidth selection," in *IEEE Trans. on Pattern Analysis and Machine Intelligence*, 25(2):281-288, Feb. 2003.

D. Comaniciu and P. Meer, "Mean shift: A robust approach toward feature space analysis," in *IEEE Trans. on Pattern Analysis and Machine Intelligence*, 24(5):603-619, May 2002.

D. Comaniciu, V. Ramesh, and P. Meer, "Kernel-based object tracking. *IEEE Trans. on Pattern Analysis and Machine Intelligence*," in 25(5):564-577, May 2003.

A. Elgammal, R. Duraiswami, and L. S. Davis "Probabilistic tracking in joint feature-spatial spaces," in *Proc. IEEE Conf. on Computer Vision and Pattern Recognition*, 2003.

A. Jepson, D. Fleet, and T. El-Maraghi, "Robust online appearance models for visual tracking," in *Proc. IEEE Conf. on Computer Vision and Pattern Recognition*, 2001.

A. Rao, R. Srihari, and Z. Zhang, "Spatial color histograms for content-based image retrieval," in *Proc. IEEE Intl. Conf. on Tools with Artificial Intelligence*, 1999.

K. She, G. Bebis, H. Gu, and R. Miller, "Vehicle tracking using on-line fusion of color and shape features," in *Proc. IEEE Conf. on Intelligent Transportation Systems*, 2004.

J. Wang, B. Thiesson, Y. Xu, and M. Cohen, "Image and video segmentation by anisotropic kernel mean shift" in *Proc. European Conference on Computer Vision*, 2004.

Q. Zhao and H. Tao, "Object tracking using color correlogram," in *Proc. IEEE Conf. on Computer Vision and Pattern Recognition*, 2005.

Z. Zivkovic and B. Krose, "An em-like algorithm for color-histogram-based object tracking," in *Proc. IEEE Conf. on Computer Vision and Pattern Recognition*, 2004.

* cited by examiner

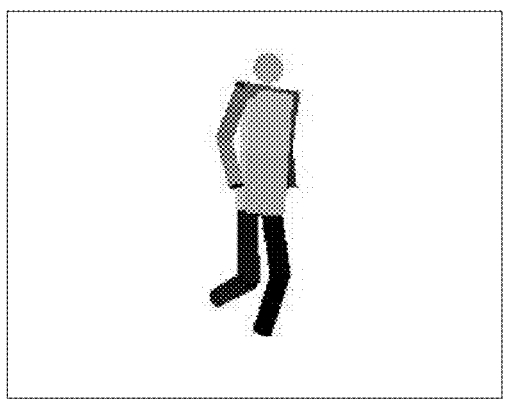
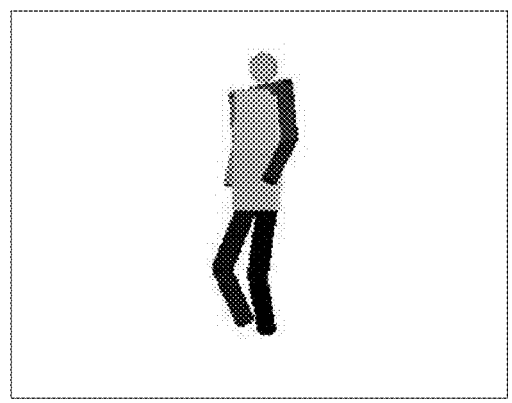
FIG. 1               FIG. 2

TUNABLE KERNELS FOR TRACKING

CROSS-REFERENCE TO RELATED APPLICATIONS

This application claims the benefit of U.S. Provisional Application No. 60/758,243, filed Jan. 11, 2006, which is incorporated herein by reference.

BACKGROUND OF THE INVENTION

The present invention relates to vision systems. More in particular it relates to real-time object tracking in vision systems using mean-shift iterations.

The classic formulation of the tracking problem using mean-shift iterations encodes spatial information very loosely (i.e. using radially symmetric kernels). A problem with such a formulation is that it becomes easy for the tracker to get confused with other objects having the same feature distribution but different spatial configurations of features. Subsequent approaches have addressed this issue but not to the degree of generality required for tracking specific classes of objects (e.g. humans).

A key issue is to have a tracker that encodes the spatial configuration of features along with their density and yet retains robustness to spatial deformations and feature density variations.

Accordingly methods providing improved tracking performance in using mean-shift iterations are required.

SUMMARY OF THE INVENTION

The present invention presents in one aspect a novel method and system that will provide tunable kernels for improved mean-shift tracking of objects in consecutive image frames.

In accordance with a further aspect of the present invention a method is provided for creating a tunable representation of an object for mean-shift iterations tracking from a target region to a candidate region in consecutive image frames, comprising: encoding a target region as a spatial configuration of an object using a plurality of kernels; determining an expression for a spatial configuration of the candidate region from the target region; and optimizing a bandwidth parameter of a kernel.

In accordance with another aspect of the present invention a method is provided wherein a kernel is a block with a tunable bandwidth.

In accordance with a further aspect of the present invention a method is provided for encoding a target region by including bandwidth parameters of the kernels so that it penalizes an appearance of pixels at large distances from kernels where a similar appearance occurs; and that uses radially symmetric kernels.

In accordance with another aspect of the present invention a method is provided wherein a bandwidth of a block depends on a reach of motion.

In accordance with a further aspect of the present invention a method is provided wherein a spatial density of a candidate region is expressed as:

$$\hat{p}_u(y) = C_p \sum_{i=1}^{N} \delta[b(x_i) - u] \sum_{j=1}^{M} S_j^{(u)} k\left(\left\|\frac{x_i - y - \bar{z}_j}{h_j}\right\|^2\right)$$

wherein $\bar{z}_j$ is the center of block j and $h_j$ is the bandwidth of block j.

In accordance with another aspect of the present invention a method is provided wherein a mean shift vector is expressed as:

$$y^{(t+1)} = \frac{\sum_{i=1}^{N} w_i \left(\alpha_i^{(u_i,t)} x_i - v_i^{(u_i,t)}\right)}{\sum_{i=1}^{N} w_i \alpha_i^{(u_i,t)}};$$

and wherein $$\alpha_i^{(u,t)} = \sum_{j=1}^{M} \frac{1}{h_j^2} S_j^{(u)} C_{ij}^{(t)} \text{ and } v_i^{(u,t)} = \sum_{j=1}^{M} \frac{1}{h_j^2} S_j^{(u)} C_{ij}^{(t)} \bar{z}_j.$$

In accordance with a further aspect of the present invention a method is provided wherein the optimized bandwidth of a kernel is estimated by using motion capture.

In accordance with another aspect of the present invention a method is provided wherein a tracked object is a pedestrian.

In accordance with a further aspect of the present invention a method is provided wherein the bandwidth of a plurality of kernels is determined by maximizing a functional of a class-separation metric.

In accordance with another aspect of the present invention a method is provided wherein the bandwidth of the plurality of kernels is determined by maximizing a functional of a class-discrimination metric.

In accordance with a further aspect of the present invention, a system including a processor and software operable on the processor to perform the previously stated tasks and methods is provided.

DESCRIPTION OF THE DRAWINGS

FIG. 1 provides a sample image from motion capture.

FIG. 2 provides another sample image from motion capture.

DESCRIPTION OF A PREFERRED EMBODIMENT

Figure 3:
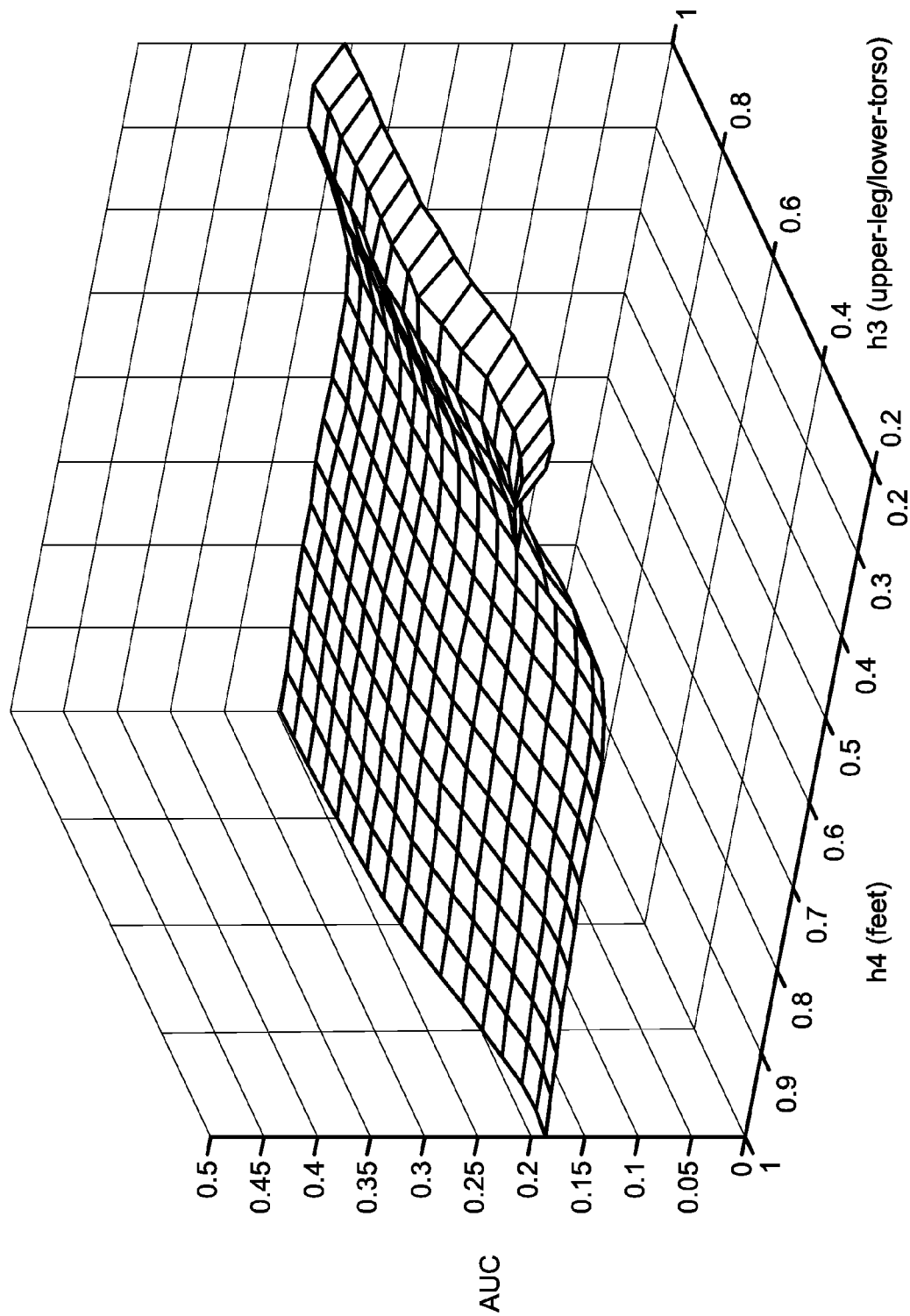
FIG. 3 is a graph of a cost surface for a set of bandwidths.

The present invention relates to real-time object tracking, which remains a challenging problem and is of particular relevance in today's emerging application domains such as visual surveillance, driver assistance etc. A crucial component in a solution to tracking is object representation, where a key challenge is to capture the 'right' amount of variability of the object. Too much rigidity (e.g. template based approaches) or too much flexibility (e.g. feature-histogram based approaches) will restrict the environments where a tracker can work reliably. The 'right' amount of variability naturally depends on the specific types of motion and the class of object being tracked. It is one aspect of the present invention to provide an optimal way to use this type of a priori knowledge for target representation: specifically, how to encode variability, and how to learn this variability automatically.

The present invention also relates to the mean-shift tracker, originally presented in D. Comaniciu, V. Ramesh, and P. Meer, "Kernel-based object tracking. *IEEE Trans. on Pattern Analysis and Machine Intelligence*," in 25(5):564-577, May 2003. Key advantages of the tracker include fast operation, robustness and invariance to a large class of object deformations. A large body of work followed the cited publication, exploring various related aspects such as feature spaces, including R. Collins, "Mean-shift blob tracking through scale space," in *Proc. IEEE Conf. on Computer Vision and Pattern Recognition*, 2003 and K. She, G. Bebis, H. Gu, and R. Miller, "Vehicle tracking using on-line fusion of color and shape features," in *Proc. IEEE Conf. on Intelligent Transportation Systems*, 2004, encoding of spatial information, including recently Q. Zhao and H. Tao, "Object tracking using color correlogram," in *Proc. IEEE Conf. on Computer Vision and Pattern Recognition*, 2005 and S. Birchfield and S. Rangarajan, "Spatiograms versus histograms for region-based tracking," in *Proc. IEEE Conf. on Computer Vision and Pattern Recognition*, 2005, shape adaptation, including H. Zhang, Z. Huang, W. Huang, and L. Li, "Kernel-based method for tracking objects with rotation and translation," in *Proc. International Conf. on Pattern Recognition*, 2004 and Z. Zivkovic and B. Krose, "An em-like algorithm for color-histogram-based object tracking," in *Proc. IEEE Conf. on Computer Vision and Pattern Recognition*, 2004, etc.

The representation chosen in the original formulation is a weighted feature histogram, where each pixel is weighted by a radially symmetric kernel that depends upon its normalized spatial distance from the object center (i.e. a kernel modulated histogram). Use of a radially symmetric kernel renders the representation invariant to a large set of transformations (any transformation that preserves the distance of a pixel from the center—e.g. rotations). While the weighting scheme may be appropriate if nothing a priori were known about the object or types of motion that it can undergo, this large amount of invariance poses problems when the object moves close to a region having a similar feature histogram but very different spatial configuration of features, resulting in multiple peaks for the cost function being maximized and confusion for the tracker.

A second issue is that of bandwidth selection for the spatial modulation. Though a significant amount of work has addressed the issue of bandwidth selection for segmentation problems (e.g. D. Comaniciu, "An algorithm for data-driven bandwidth selection," in *IEEE Trans. on Pattern Analysis and Machine Intelligence*, 25(2):281-288, February. 2003 and J. Wang, B. Thiesson, Y. Xu, and M. Cohen, "Image and video segmentation by anisotropic kernel mean shift" in *Proc. European Conference on Computer Vision,* 2004) it is not clear how it could be adapted to encode acceptable deformations of a tracked object.

A number of papers have addressed the issue of encoding spatial information into the representation. G. D. Hager, M. Dewan, and C. Stewart, "Multiple kernel tracking with ssd," in *Proc. IEEE Conf. on Computer Vision and Pattern Recognition,* 2004 analyze the types of motion that the kernel-modulated histogram is invariant to, and propose distributing kernels spatially to capture enough information to recover specific kinds of object motion (e.g. rotation). 'Color correlograms' are used in Q. Zhao and H. Tao, "Object tracking using color correlogram," in *Proc. IEEE Conf. on Computer Vision and Pattern Recognition,* 2005 to capture the co-occurrences of pairs of colors separated by specific distances along orthogonal directions. The primary focus there is to determine the orientation of a tracked object and no clear methodology is given for distance selection. 'Spatiograms' are defined in S. Birchfield and S. Rangarajan, "Spatiograms versus histograms for region-based tracking," in *Proc. IEEE Conf. on Computer Vision and Pattern Recognition,* 2005 as an extension to the feature histogram to include higher order statistics of the spatial distributions (the feature histogram itself being a 'zero$^{th}$' order statistic). It is demonstrated that such a representation allows the mean-shift based tracker to lock on to the target more accurately but does not necessarily succeed where the original tracker fails. A. Elgammal, R. Duraiswami, and L. S. Davis's "Probabilistic tracking in joint feature-spatial spaces," in *Proc. IEEE Conf. on Computer Vision and Pattern Recognition,* 2003 represent an object in a joint feature-spatial space and show that histogram based trackers and template based trackers are special cases of their general representation.

For kernel modulation, all the cited papers use a radially symmetric kernel with a globally fixed bandwidth, and do not describe how one should choose its value. More importantly, the key representation issue of how one can formulate acceptable deformations for the target and use it to improve tracking is not addressed.

The present invention provides key contributions towards addressing the issue of object representation for articulated object tracking that allows one to learn and specify object appearance changes. According to one aspect of the present invention, a method for kernel modulation that depends upon a set of spatially distributed kernels across the target with variable bandwidths and derive a mean-shift based tracking algorithm, which runs in real-time will be provided. According to another aspect of the present invention, a method will be provided for estimating the bandwidth parameters which will be demonstrated for the case of pedestrian tracking by setting up a data-driven optimization problem, where the data come from human motion capture. Statistically superior performance of the proposed tracker will be demonstrated as compared to the original tracker on real and synthetic image sequences.

Formulation

Let 'target' denote the object being tracked and let 'candidate' represent an image patch under consideration. Following standard notation, let the target be represented by its feature histogram: $\hat{q}=\{\hat{q}_u\}_{u=1...m}$ where $\Sigma_{u=1}^m \hat{q}_u = 1$. Let the target candidate centered at y be represented by its histogram: $\hat{p}(y)=\{\hat{p}_u(y)\}_{u=1...m}$ where $\Sigma_{u=1}^m \hat{p}_u(y)=1$. Let $x_i$ denote the coordinates of the $i^{th}$ pixel in the candidate and let $\bar{x}_i$ denote the coordinates of the $i^{th}$ pixel in the target (with center at the origin). The goal is to move to a new position y given a starting position $y_0$. The unweighted ('raw') histogram can be computed as follows:

$$\hat{q}_u = \frac{1}{N} \sum_{i=1}^{N} \delta[b(\bar{x}_i) - u] \quad (1)$$

where the function b(.) maps a pixel to its feature value. If one was to weight a pixel spatially, a weighting function b(.) can be used:

$$q_u = C_q \sum_{i=1}^{N} \delta[b(\bar{x}_i) - u]\psi(\bar{x}_i) \quad (2)$$

where Cq is a normalization constant. Similarly, the density at candidate center y is given by:

$$\hat{p}_u(y) = C_p \sum_{i=1}^{N} \delta[b(x_i) - u]\psi(x_i - y) \quad (3)$$

The original mean-shift based tracker as described in D. Comaniciu, V. Ramesh, and P. Meer, "Kernel-based object tracking. *IEEE Trans. on Pattern Analysis and Machine Intelligence,*" in 25(5):564-577, May 2003, chooses a weighting function that is a radially symmetric kernel function with a given bandwidth $$h:\psi(\bar{x}_i) \equiv k\left(\left\|\frac{\bar{x}_i}{h}\right\|^2\right).$$

The intuition there is encode a heuristic that pixels near the center are more likely to come from the target. If nothing is known about the object a priori, this appears to be a reasonable choice for $\psi(.)$. Note that all transformations that preserve distance of each pixel from the center result in identical histograms for the above choice for $\psi(.)$. This may be an overly permissive invariance than is required for tracking certain classes of object. For example, if the problem context involves human beings walking upright in the scene, one would like $\psi(.)$ to encode the constraint that humans do not suddenly invert their appearance while walking. On the other hand, one would also like to choose $\psi(.)$ so that robustness to acceptable spatial deformations of the object is retained. It is one aspect of the present invention to provide and use the best $\psi(.)$, given the a priori knowledge that the target belongs to a certain class—e.g. humans walking upright. A parametric family of functions will be considered distinguished by a parameter vector $\Theta$. Hence, $\psi(.) \equiv \psi(x_i, \Theta)$. One can choose $\psi(.)$ as being (the motivation will be explained):

$$\psi(x) = \sum_{j=1}^{N} \delta[b(x) - b(\bar{x}_j)]k\left(\left\|\frac{x - x_j}{h_j}\right\|^2\right) \quad (4)$$

Here k(x) is any convex, monotonically decreasing kernel profile as in the original formulation. $\Theta = \{h_j\}$ denotes the set of bandwidths associated with each spatial position j in the target and specifies the allowed motion of the pixel. For positions that are expected to move very little, their $h_j$ should be small, penalizing pixels of the same feature that are observed far away from where they appeared in the target. In practice, rather than choosing a bandwidth for each pixel in the target, it is more efficient to divide the target into M blocks ($B_j$, j=1, ... M) and specify a bandwidth for each block. This is done as follows: During initialization, the spatial distribution $S_j^{(u)}$ of feature u is calculated as follows:

$$S_j^{(u)} = C_S^{(u)} \sum_{\bar{x} \in B_j} \delta[b(\bar{x}) - u] \quad (5)$$

wherein $S_j^{(u)}$ denotes the fraction of pixels of feature u that occur in block j of the target and $C_S^{(u)}$ is a normalization constant (this bears resemblance to the 'annular histogram' used in A. Rao, R. Srihari, and Z. Zhang, "Spatial color histograms for content-based image retrieval," in *Proc. IEEE Intl. Conf. on Tools with Artificial Intelligence,* 1999.) The candidate density now becomes:

$$\hat{p}_u(y) = C_p \sum_{i=1}^{N} \delta[b(x_i) - u] \sum_{j=1}^{M} S_j^{(u)} k\left(\left\|\frac{x_i - y - \bar{z}_j}{h_j}\right\|^2\right) \quad (6)$$

Here $\bar{z}_j$ denotes the center of block j. The motivation behind the choice for $\psi(.)$ is two fold. Firstly, the bandwidth parameter $h_j$ allows penalizing the appearance of pixels at large distances from blocks where the same feature was observed. The bandwidths can be tuned for specific classes of objects and specify acceptable deformations for that class (it will be shown how to estimate this). As an example, for humans walking upright in a scene, the torso appearance is expected to be fairly constant, and so the bandwidths corresponding to torso blocks will be small. On the other hand, blocks near the feet would have a larger bandwidth to account for larger motion. Secondly, as the formulation still uses radially symmetric kernels it remains amenable to mean-shift iterations.

Given an initial target position $y_0$, the goal is to move to a new position which maximizes the Bhattacharya coefficient ρ between the candidate region and the target region. It can be shown (as was done in D. Comaniciu, V. Ramesh, and P. Meer, "Kernel-based object tracking. *IEEE Trans. on Pattern Analysis and Machine Intelligence,*" in 25(5):564-577, May 2003) that for a small motion Δy around $y_0$ the Bhattacharya coefficient can be approximated as:

$$\rho(\hat{p}(y_0 + \Delta y), \hat{q}) \approx \frac{1}{2}\rho(\hat{p}(y_0), \hat{q}) + \frac{1}{2}\sum_{u=1}^{m}\sqrt{\frac{\hat{q}_u}{\hat{p}_u(y_0)}}\hat{p}_u(y)} \quad (7)$$

The first term being a constant, $\Delta y$ is chosen such that the following is maximized:

$$\sum_{i=1}^{N}\sqrt{\frac{\hat{q}_{u_i}}{\hat{p}_{u_i}(y_0)}}\sum_{j=1}^{M}S_j^{(u_i)}k\left(\left\|\frac{x_i - y - \bar{z}_j}{h_j}\right\|^2\right) \quad (8)$$

Here $u_i$ is the feature at pixel i. Let $$w_i = \sqrt{\frac{\hat{q}_{u_i}}{\hat{p}_{u_i}(y_0)}}.$$

After taking the gradient and some algebra (similar to what is described in D. Comaniciu and P. Meer, "Mean shift: A robust approach toward feature space analysis," in *IEEE Trans. on Pattern Analysis and Machine Intelligence,* 24(5):603-619, May 2002), one finds that the mean-shift vector (i.e the position that maximizes the Bhattacharya coefficient and hence, one that best matches the candidate with the target) is the following:

$$y^{(t+1)} = \frac{\sum_{i=1}^{N}w_i\sum_{j=1}^{M}S_j^{(u_i)}g\left(\left\|\frac{x_i - y^{(t)} - \bar{z}_j}{h_j}\right\|^2\right)\left(\frac{x_i - \bar{z}_j}{h_j^2}\right)}{\sum_{i=1}^{N}w_i\sum_{j=1}^{M}S_j^{(u_i)}g\left(\left\|\frac{x_i - y^{(t)} - \bar{z}_j}{h_j}\right\|^2\right)\left(\frac{1}{h_j^2}\right)} \quad (9)$$

where $g(.)=-k'(.)$. For k, one may use the 2D Epanechnikov kernel:

$$k(x) = \begin{cases} \frac{2}{\pi}(1-x) & \text{if } x \leq 1 \\ 0 & \text{otherwise} \end{cases} \quad (10)$$

In this case, the derivative is constant or zero and one defines:

$$C_{ij}^{(t)} = \begin{cases} 1 & \text{if } \left\|\frac{x_i - y^{(t)} - \bar{z}_j}{h_j}\right\| \leq 1 \\ 0 & \text{otherwise} \end{cases} \quad (11)$$

The mean-shift vector now takes on a simpler form:

$$y^{(t+1)} = \frac{\sum_{i=1}^{N}w_i\sum_{j=1}^{M}S_j^{(u_i)}C_{ij}^{(t)}\left(\frac{x_i - \bar{z}_j}{h_j^2}\right)}{\sum_{i=1}^{N}w_i\sum_{j=1}^{M}S_j^{(u_i)}C_{ij}^{(t)}\left(\frac{1}{h_j^2}\right)} \quad (12)$$

Define the following two quantities:

$$\alpha_i^{(u,t)} = \sum_{j=1}^{M}\frac{1}{h_j^2}S_j^{(u)}C_{ij}^{(t)} \quad (13)$$

$$v_i^{(u,t)} = \sum_{j=1}^{M}\frac{1}{h_j^2}S_j^{(u)}C_{ij}^{(t)}\bar{z}_j$$

The mean-shift vector becomes $$y^{(t+1)} = \frac{\sum_{i=1}^{N}w_i\left(\alpha_i^{(u_i,t)}x_i - v_i^{(u_i,t)}\right)}{\sum_{i=1}^{N}w_i\alpha_i^{(u_i,t)}} \quad (14)$$

Note that if one simply used one block centered in the middle, the mean-shift vector reduces to the original version derived in D. Comaniciu, V. Ramesh, and P. Meer, "Kernel-based object tracking. *IEEE Trans. on Pattern Analysis and Machine Intelligence,*" in 25(5):564-577, May 2003, (because $\bar{z}=0$ and $\alpha_i^{(u,t)}=1$).

Tuning the Bandwidths

The primary interest is in tracking pedestrians in a scene although the method described here can be adapted to many other classes of objects and motions. The bandwidths depend upon the extent of deformation the target undergoes, and as one aspect of the present invention motion capture data is used to estimate the deformations. Motion capture allows a lot of flexibility: a dense deformation map of each patch on the body can calculated by texture-mapping it with a unique color and rendering the motion in a controlled graphical environment. Since a patch is uniquely colored one can easily locate it in all rendered images and determine its set of movements (see FIGS. 1 and 2 for two example images).

Several humans walking and rotating simultaneously in place are rendered and images are collected (note that each image represents one pose). Given a choice of bandwidths $\Theta$, the set of histograms $H^+(\Theta)$ are calculated. One wishes to choose $\Theta$ so that it maximizes the similarity between elements in $H^+(\Theta)$. However, such a 'one-class optimization' may overly increase the bandwidths, attempting to accommodate all the poses and thereby reducing the discriminating power of the representation. In principle, one would like to simultaneously minimize the similarity between the elements in the set $H^+(\Theta)$ and those in a negative set $H^-(\Theta)$. The construction of $H^-(\Theta)$ depends upon the end application and denotes the set of object appearance changes that are unacceptable. One way to construct $H^-(\Theta)$ is to swap the colors about a horizontal axis (implicitly encoding the fact that the head region cannot move to the feet region and vice versa, for example). Another choice is to render each pose after randomly redistributing the colors. Yet another choice is the set of all possible histograms in the color space (thereby giving rise to a uniformly distributed Bhattacharyya distance with respect to elements in $H^+(\Theta)$).

In the present case, random redistribution of the colors was used. Let the probability distribution of pairwise Bhattacharyya coefficients in the set $H^+(\Theta)$ be $p^+(\rho|\Theta)$ and let the probability distribution of Bhattacharyya coefficients between elements in $H^+(\Theta)$ and those in $H^-(\Theta)$ be $p^-(\rho|\Theta)$. Consider a given choice of bandwidths $\Theta$. For a given cut-off threshold $\rho_t$, the two types of errors, i.e. the miss-detection and false-alarm rates can be written down as follows:

$$m(\Theta, \rho_t) = \int_0^{\rho_t} p^+(\rho|\Theta)d\rho \qquad (15)$$

$$f(\Theta, \rho_t) = \int_{\rho_t}^1 p^-(\rho|\Theta)d\rho$$

For various choices of $\rho_t$, the errors in $m(\Theta,\rho_t)$ and $f(\Theta,\rho_t)$ when plotted against each other, trace an ROC (Receiver Operating Characteristics) curve. The area under the ROC curve (AUC) integrates out various choices for $\rho_t$ and is a measure of how well the set of bandwidths $\Theta$ discriminates between the two classes. Smaller AUC implies better discrimination with zero AUC implying best discrimination. A random discriminator will have AUC of ½. The best $\Theta$ to use can be found as the solution to the following optimization problem:

$$\Theta^* = \operatorname{argmin}\left( \int_0^1 m(\Theta, \rho_t) \left[ \frac{df(\Theta, \rho_t)}{d\rho_t} \right] d\rho_t \right) \qquad (16)$$

First, the body is normalized into a square and 4 equally sized vertical blocks are used which makes $\Theta=(h_1, h_2, h_3, h_4)$ and $0 \leq hj \leq 1$ (here $h_1$ corresponds to the head area and $h_4$ to the feet area).

Figure 4:
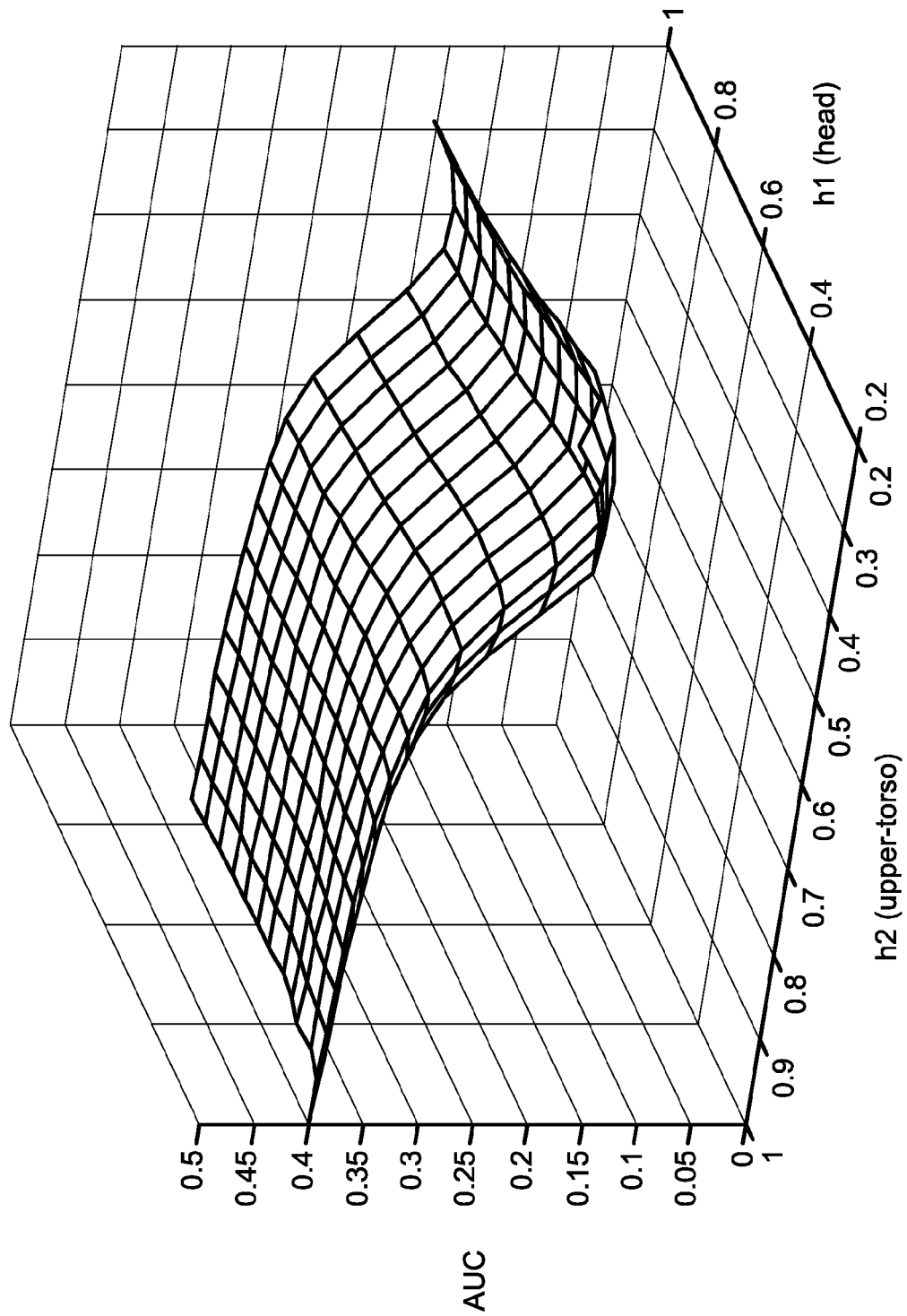
FIG. 4 is another graph of a cost surface for a set of bandwidths.

Disappointingly, it is not possible to solve for the best h analytically due to the square-roots in the Bhattacharyya distance and due to the implicit dependence of $C_{ij}^{(t)}$ on $h_j$. Since the domain is small enough and the optimization is done only once and offline, it was determined to explore the space by brute-force, using $\Delta h_j=0.05$. The optimization procedure found the optimal bandwidths to be $(h_1=0.35, h_2=0.30, h_3=0.25, h_4=1.00)$. FIGS. 3 and 4 show 3D projections of the SD space at the optimal values. A range of values for $\Theta$ was found to be able to produce good results. The bandwidth set (0.25, 0.25, 0.25, 0.75) was found to work best for all the sequences shown. FIG. 3 shows a cost surface for $\Theta=(0.35, 0.30, h_3, h_4)$ and FIG. 4 shows a cost surface $\Theta=(h_1, h_2, 0.25, 1.00)$.

Results

Figure 5:
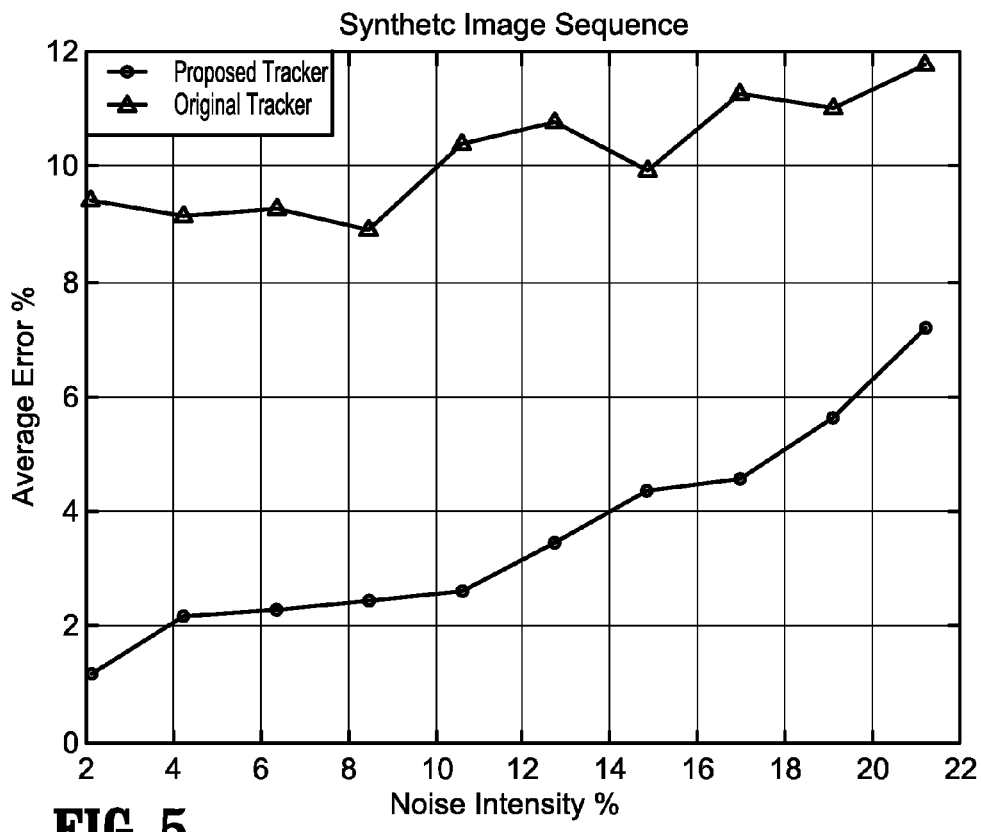
FIG. 5 is a graph comparing error trends of a first tracker and a second tracker in accordance with one aspect of the present invention.
Figure 6:
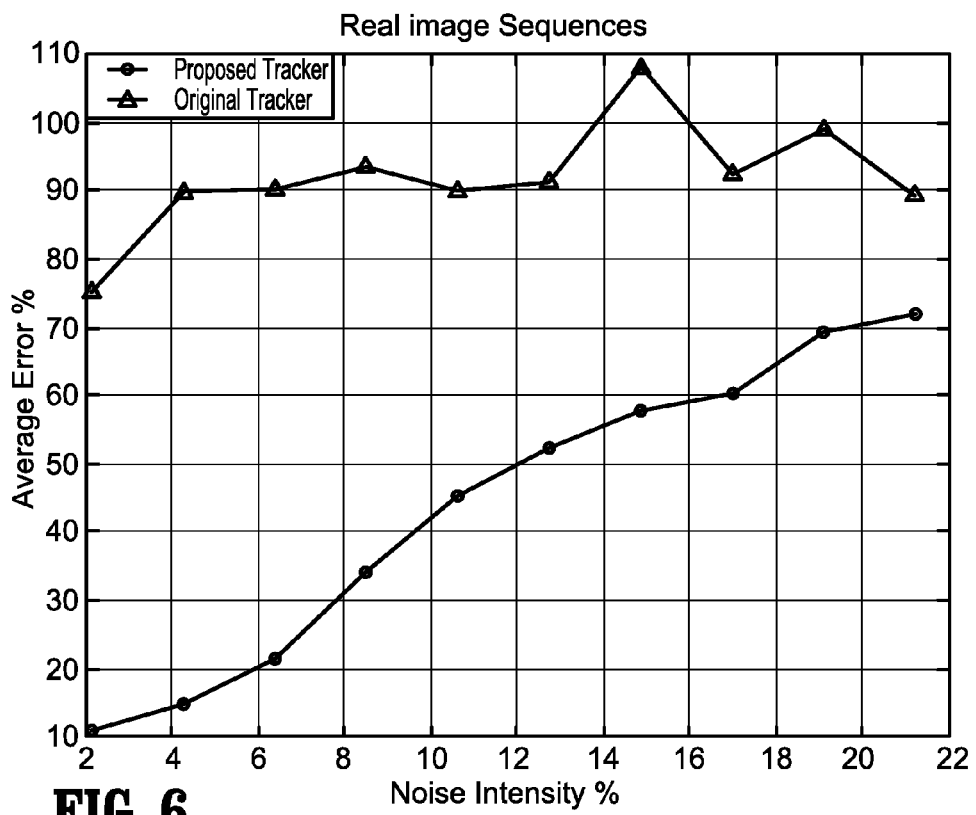
FIG. 6 is another graph comparing error trends of a first tracker and a second tracker in accordance with one aspect of the present invention.

The behaviors of the original mean-shift tracker and the tracker provided as one aspect of the present invention are compared on one synthetic and four real image sequences. Both trackers used RBG color as the feature space with 4 bits per channel. For both trackers, scale adaptation was done by searching for a small range of scales at each frame and choosing the best one. Also, identical starting positions were used for both. One can observe that in the presence of objects of similar feature distribution but quite different spatial configuration of features, there will be competing peaks in the cost function surface being optimized by the original tracker. However, the proposed tracker should suppress competing peaks. Hence, on average, one would expect the proposed tracker to follow the correct target more often. To demonstrate this, the statistical behavior of the trackers was analyzed as follows: For the set of image sequences, one first generates a ground truth semi-automatically, i.e. for each image sequence, for a successful run of the tracker (verified visually), the tracker trajectory was stored as ground truth. Following this, repeated trials were carried out where, at each frame, the coordinates returned by the tracker were perturbed before they were fed back to the tracker. The average error per noise level was considered as a measure of how well each tracker performed. FIGS. 5 and 6 show the measure for the synthetic and real image sequence case (averaged over all four). They show the error trend for increasing noise levels for the original and proposed trackers.

Figure 7:
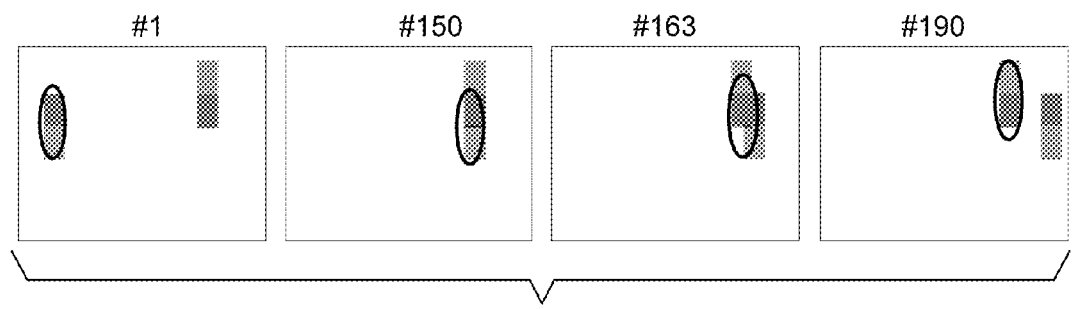
FIG. 7 is a synthetic image sequence of 4 image frames using a tracker.
Figure 8:
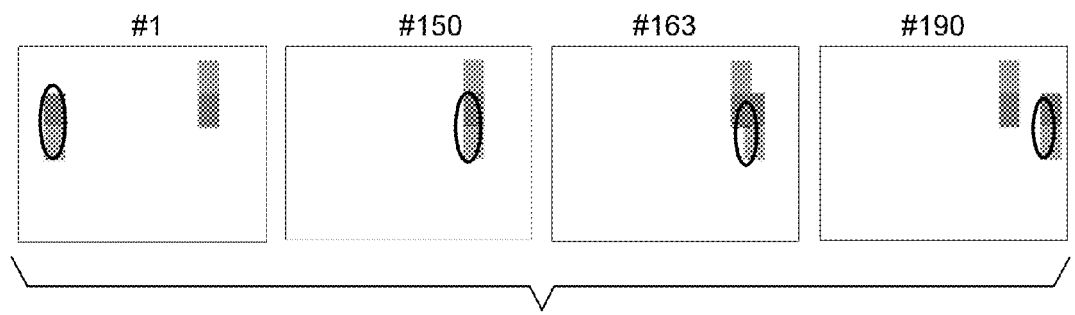
FIG. 8 is the synthetic image sequence of FIG. 7 using a tracker in accordance with the present invention.

The source of the perturbation was Gaussian noise of zero mean and unit standard deviation. The perturbation at each frame was arrived at by multiplying the noise with the object dimension and scaling it by a 'noise level' factor. The error shown is a multiple of the object dimension. Note that only the error trend is of relevance, not the actual magnitudes which will depend upon the distance between the target and the confusion peaks in that specific scenario. It can be seen that the error is lower for the proposed tracker as was expected. The error for the original tracker was high even with no perturbation of the trajectory because of competing objects in the vicinity and the perturbation sometimes improved its performance because it pushed the tracker more towards the correct target occasionally. Some specific examples from the image sequences will be shown. FIG. 7 shows consecutive frames of a rectangular block being tracked by the original tracker and overlapping another 'decoy' block with the same color distribution but inverted spatial configuration of colors. FIG. 8 shows the same consecutive frames as in FIG. 7 with the novel tracker according to one aspect of the present invention using two vertically stacked zones with identical bandwidths of 0.3.

During repeated trials as described above, the original tracker got attracted to the second block more often than the novel tracker and FIGS. 7 and 8 show one such run. The real-life image sequences demonstrate potential confusion for the tracker due to the presence of objects with similar color but different spatial configurations of the colors and temporary occlusions.

Figure 9:
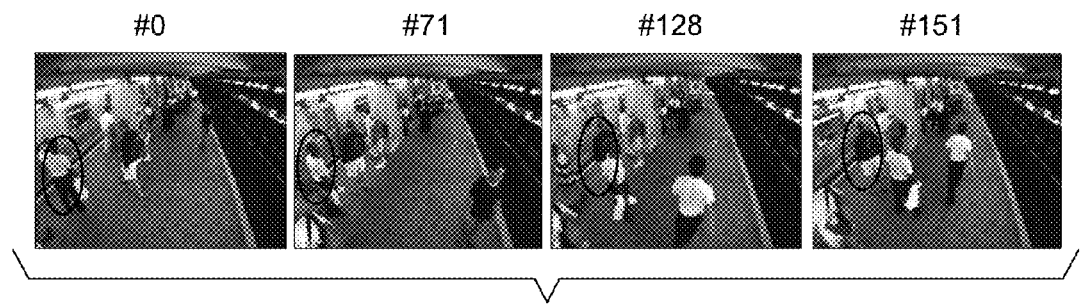
FIG. 9 is a sequence of 4 image frames of a scene using a tracker.
Figure 10:
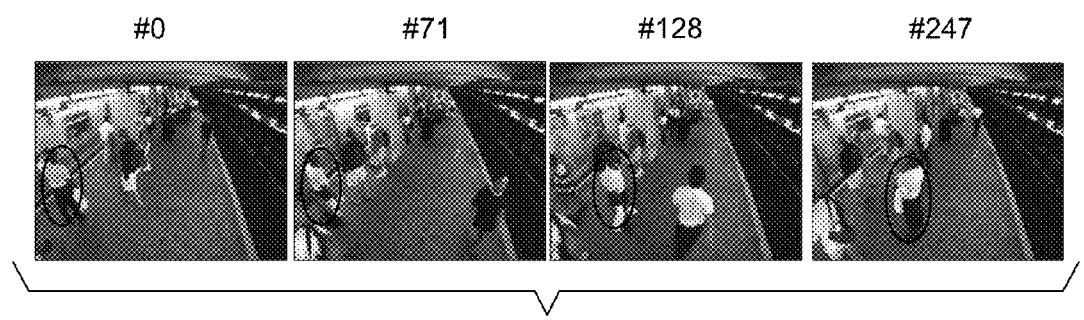
FIG. 10 is a sequence of 4 image frames of the scene of FIG. 9 using a tracker in accordance with one aspect of the present invention.

FIGS. 9 and 10 show frame sequences of a canonical example where the target is a person with a white shirt and black pants. The person moves to the right, first occluding and then revealing another person with a black shirt and white pants. The original mean-shift tracker gets attracted to the second person as shown in frames #128 and #247 in FIG. 9. The novel tracker applied to the same frames follows the original person as shown in the frames of FIG. 10.

Figure 11:
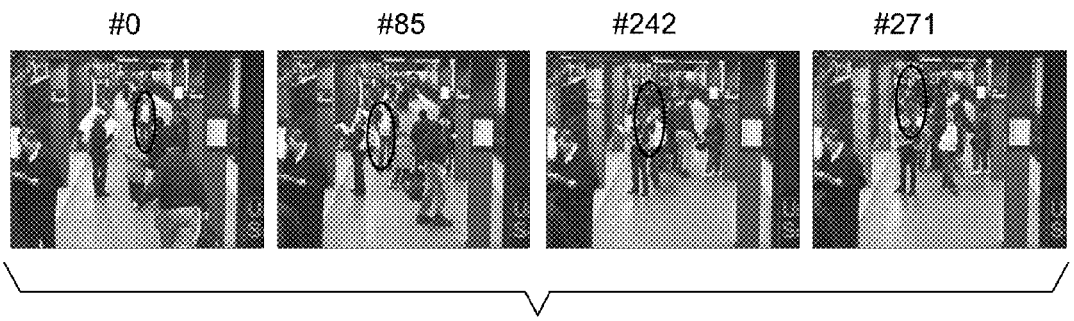
FIG. 11 is a sequence of 4 image frames of a scene using a tracker.
Figure 12:
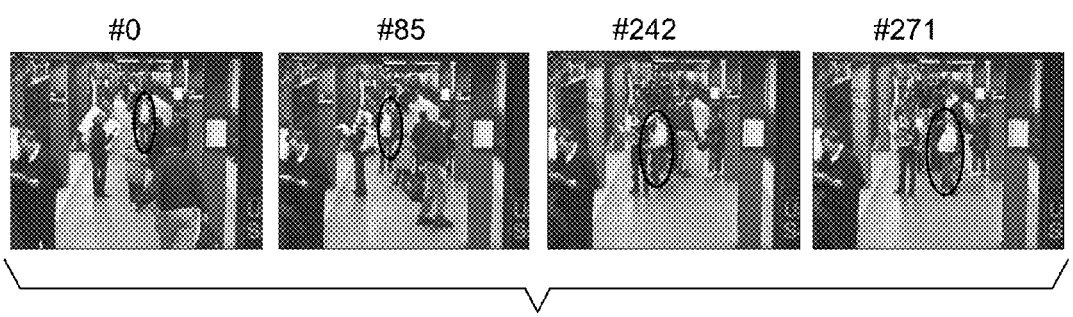
FIG. 12 is the sequence of 4 image frames of the scene of FIG. 11 using a tracker in accordance with one aspect of the present invention.

FIGS. 11 and 12 show an example of a sequence of frames #0, #85, #242 and #271 where the person being tracked gets occluded partially and then reemerges around frame 242. FIG. 11 shows tracking by the original tracker and FIG. 12 shows tracking by the novel tracker. The novel tracker follows the person quite well whereas the original tracker loses the person to the background.

Figure 13:
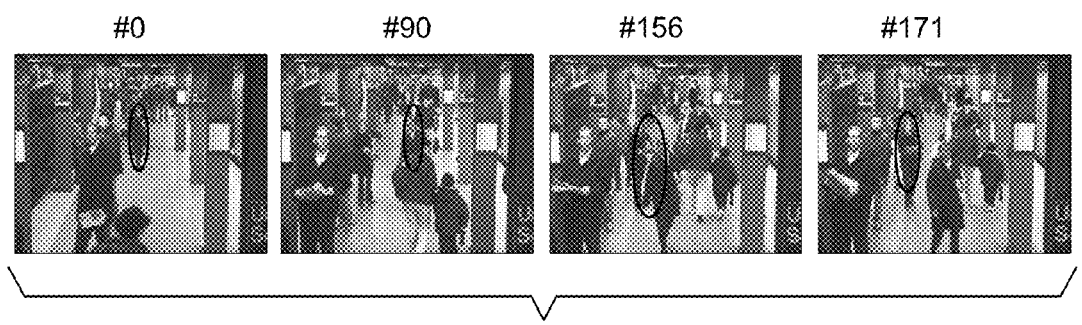
FIG. 13 is a sequence of 4 image frames of a scene using a tracker.
Figure 14:
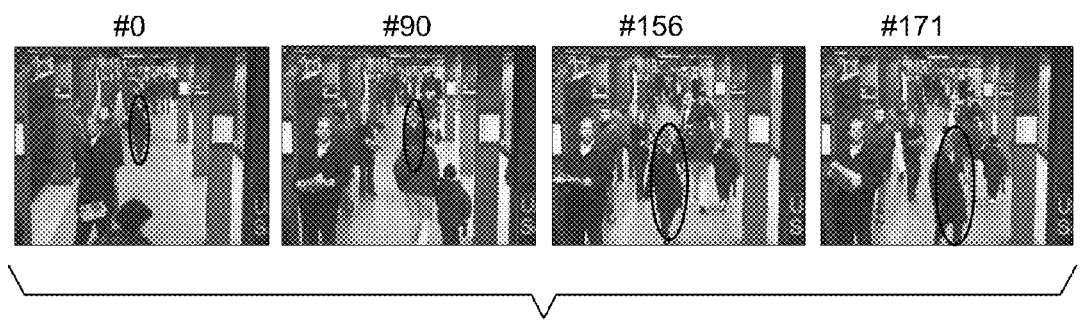
FIG. 14 is the sequence of 4 image frames of the scene of FIG. 13 using a tracker in accordance with one aspect of the present invention.

FIGS. 13 and 14 show a similar example of a sequence of frames #0, #90, #156 and #171, wherein FIG. 13 shows the original tracker and FIG. 14 shows the novel tracker.

Figure 15:
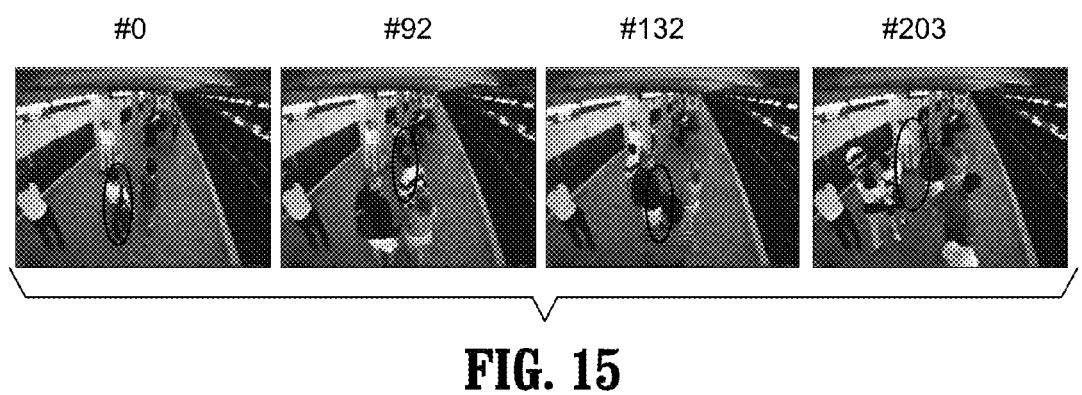
FIG. 15 is a sequence of 4 image frames of a scene using a tracker.
Figure 16:
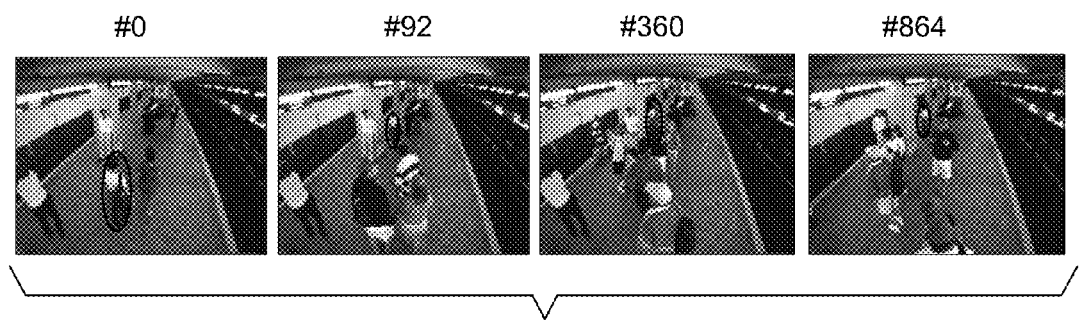
FIG. 16 is a sequence of 4 image frames of an extended scene of FIG. 15 using a tracker in accordance with one aspect of the present invention.

FIGS. 15 and 16 show an example where the tracked person shrinks in size fast, bends and gets occluded frequently. FIG. 15 shows the original tracker and FIG. 16 the novel tracker. The novel tracker is able to withstand these effects for an extended period of time until it finally gets overwhelmed by severe occlusion. In this example, the original tracker loses the person by frame 132 in FIG. 15 while the novel tracker tracks for about 2800 frames.

Although not specifically designed to withstand occlusions, the ability of the tracker to discriminate spatially provides for robustness to small or intermittent occlusions when the target gets occluded, the tracker does not latch on to any nearby image patch with the same feature distribution because the patch likely will not conform to the expected spatial distribution of colors. Hence, there will likely not be a strong gradient in any direction, and the tracker will continue staying around the same position. It will recover if the target re-appears and there is significant overlap between the re-appearing target and the current region, resulting in a strong gradient.

In summary, a key problem with previous formulations of the tracking problem was identified, namely, that incorporation of knowledge of the object type and motion has not been addressed. According to one aspect of the present invention a method is provided to modulate the feature histogram of the target in a manner that encodes spatial information using a set of spatial kernels with variable bandwidths. It is shown how one can learn the optimal set of bandwidths for the case of pedestrians walking upright using motion capture data, and it was demonstrated that the proposed tracker tracked targets better in the presence of multiple distracting objects with similar feature distributions.

Figure 17:
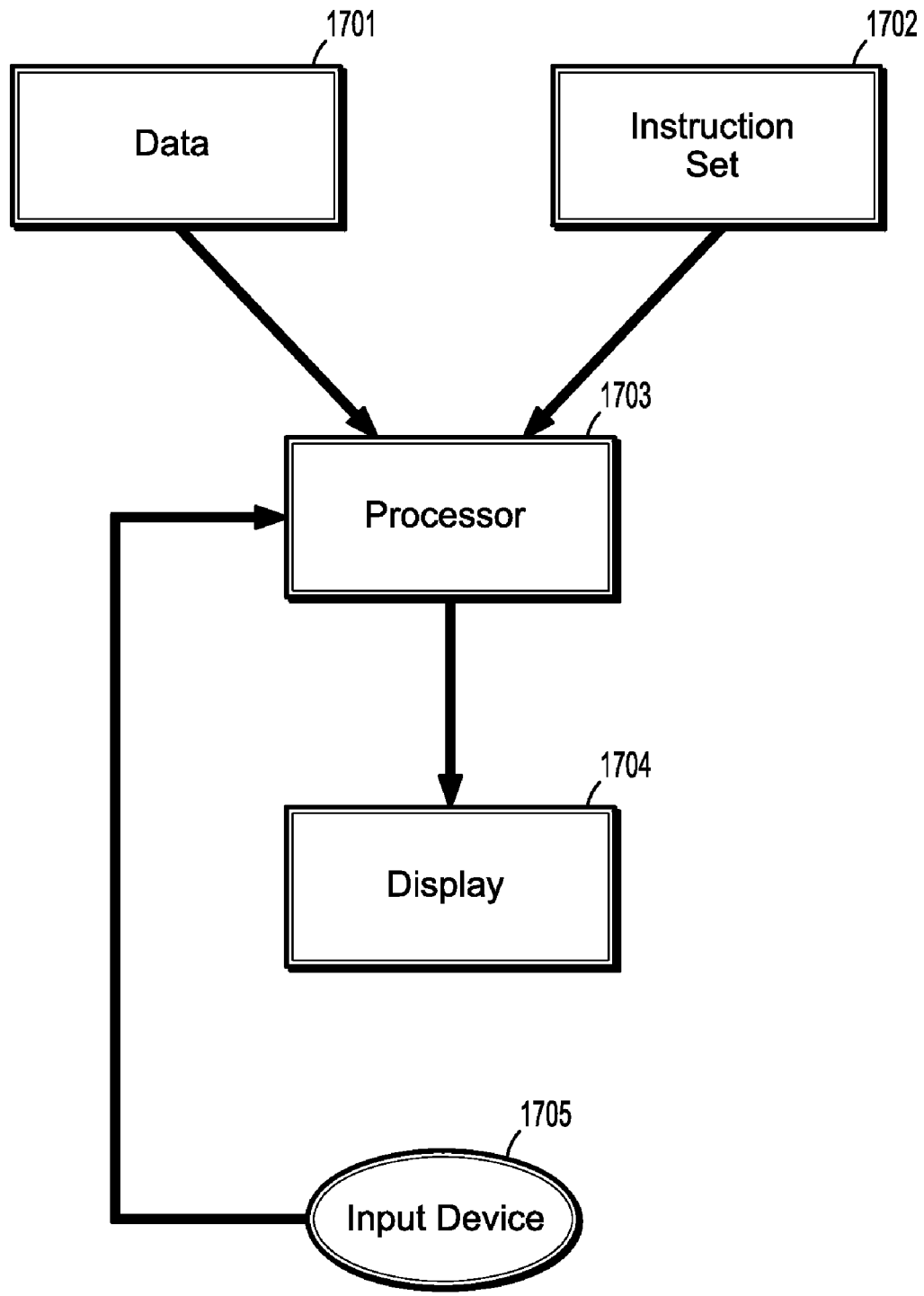
FIG. 17 illustrates a computer system that is used to perform the steps described herein in accordance with the present invention.

The tracking methods that are part of the present invention can be executed by a system as shown in FIG. 17. The system is provided with data 1701 representing image data. The data may for instance be provided real-time by a video camera. An instruction set or program 1702 executing the methods of the present invention is provided and combined with the data in a processor 1703, which can process the instructions of 1702 applied to the data 1701 and show a resulting image or image frame sequence on a display 1704, and for instance highlighting a tracked image object. The processor can be dedicated hardware. However, the processor can also be a CPU or any other computing device that can execute the instructions of 1702. An input device 1705 like a mouse, or track-ball, a key-board or other input device may be included in the system and may allow a user to select an initial object. Accordingly the system as shown in FIG. 17 provides a system for object tracking by tunable kernels. The methods here provided as different aspects of the present invention use pedestrians as illustrative examples of articulated objects. It should be clear and it is fully contemplated that the methods are suitable for any articulated object.

As an illustrative example the optimum bandwidth of a kernel is determined from motion capture. It should be clear and it is fully contemplated that an optimum bandwidth of a kernel can be determined from prior information; using motion capture is one illustrative example. As an example, if an object being tracked is a human, the optimized bandwidth can be obtained by using motion-capture data.

The following references are generally descriptive of the background of the present invention and are hereby incorporated herein by reference: [1] S. Birchfield and S. Rangarajan, "Spatiograms versus histograms for region-based tracking," in *Proc. IEEE Conf. on Computer Vision and Pattern Recognition*, 2005. [2] R. Collins, "Mean-shift blob tracking through scale space," in *Proc. IEEE Conf. on Computer Vision and Pattern Recognition*, 2003. [3] D. Comaniciu, "An algorithm for data-driven bandwidth selection," in *IEEE Trans. on Pattern Analysis and Machine Intelligence*, 25(2): 281-288, February 2003. [4] D. Comaniciu and P. Meer, "Mean shift: A robust approach toward feature space analysis," in *IEEE Trans. on Pattern Analysis and Machine Intelligence*, 24(5):603-619, May 2002. [5] D. Comaniciu, V. Ramesh, and P. Meer, "Kernel-based object tracking. *IEEE Trans. on Pattern Analysis and Machine Intelligence*," in 25(5):564-577, May 2003. [6] A. Elgammal, R. Duraiswami, and L. S. Davis "Probabilistic tracking in joint feature-spatial spaces," in *Proc. IEEE Conf. on Computer Vision and Pattern Recognition*, 2003. [7] G. D. Hager, M. Dewan, and C. Stewart, "Multiple kernel tracking with ssd," in *Proc. IEEE Conf. on Computer Vision and Pattern Recognition*, 2004. [8] A. Jepson, D. Fleet, and T. El-Maraghi, "Robust online appearance models for visual tracking," in *Proc. IEEE Conf. on Computer Vision and Pattern Recognition*, 2001. [9] A. Rao, R. Srihari, and Z. Zhang, "Spatial color histograms for content-based image retrieval," in *Proc. IEEE Intl. Conf. on Tools with Artificial Intelligence*, 1999. [10] K. She, G. Bebis, H. Gu, and R. Miller, "Vehicle tracking using on-line fusion of color and shape features," in *Proc. IEEE Conf. on Intelligent Transportation Systems*, 2004. [11] J. Wang, B. Thiesson, Y. Xu, and M. Cohen, "Image and video segmentation by anisotropic kernel mean shift" in *Proc. European Conference on Computer Vision*, 2004. [12] H. Zhang, Z. Huang, W. Huang, and L. Li, "Kernel-based method for tracking objects with rotation and translation," in *Proc. International Conf. on Pattern Recognition*, 2004. [13] Q. Zhao and H. Tao, "Object tracking using color correlogram," in *Proc. IEEE Conf. on Computer Vision and Pattern Recognition*, 2005. [14] Z. Zivkovic and B. Krose, "An em-like algorithm for color-histogram-based object tracking," in *Proc. IEEE Conf. on Computer Vision and Pattern Recognition*, 2004.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed:

1. A method for creating a tunable representation of an object for mean-shift iterations tracking from a target region to a candidate region in consecutive image frames, comprising:
   encoding by a processor of image data in the consecutive image frames representing a target region as a spatial configuration of an object using a plurality of kernels;
   determining by the processor of an expression for a spatial configuration of the candidate region from the target region; and
   optimizing by the processor of a bandwidth parameter of the plurality of kernels using prior knowledge of motion characteristics of the object.

2. The method as claimed in claim 1, wherein:
   a kernel is a block with a tunable bandwidth.

3. The method as claimed in claim 2, further comprising:
   encoding by the processor of a region by including bandwidth parameters of the plurality of kernels so that it penalizes an appearance of pixels at large distances from kernels where a similar appearance occurs; and
   the processor using radially symmetric kernels.

4. The method as claimed in claim 2, wherein a bandwidth of a block depends on a reach of motion.

5. The method as claimed in claim 1, wherein a spatial density of a candidate region is expressed as:

$$\hat{p}_u(y) = C_P \sum_{i=1}^{N} \delta[b(x_i) - u] \sum_{j=1}^{M} S_j^{(u)} k\left(\left\|\frac{x_i - y - \bar{z}_j}{h_j}\right\|^2\right);$$

and wherein $\bar{z}_j$ is the center of block j and $h_j$ is the bandwidth of block j.

6. The method as claimed in claim 5, wherein a mean shift vector is expressed as:

$$y^{(t+1)} = \frac{\sum_{i=1}^{N} w_i\left(\alpha_i^{(u_i,t)} x_i - v_i^{(u_i,t)}\right)}{\sum_{i=1}^{N} w_i \alpha_i^{(u_i,t)}};$$

and wherein $$\alpha_i^{(u,t)} = \sum_{j=1}^{M} \frac{1}{h_j^2} S_j^{(u)} C_{ij}^{(t)} \text{ and } v_i^{(u,t)} = \sum_{j=1}^{M} \frac{1}{h_j^2} S_j^{(u)} C_{ij}^{(t)} \bar{z}_j.$$

7. The method as claimed in claim 2, wherein the optimized bandwidth of a kernel is estimated by using motion capture.

8. The method as claimed in claim 2, wherein the object is articulated.

9. The method as claimed in claim 2, wherein the bandwidth of the plurality of kernels is determined by the processor by maximizing a functional of a class-separation metric.

10. The method as claimed in claim 2, wherein the bandwidth of the plurality of kernels is determined by the processor by maximizing a functional of a class-discrimination metric.

11. A system for mean-shift tracking an object in a target region to a candidate region in consecutive image frames, comprising:
a processor;
software operable on the processor for:
encoding a target region as a spatial configuration of an object using a plurality of kernels;
determining an expression for a spatial configuration of the candidate region from the target region; and
optimizing a bandwidth parameter of the plurality of kernels using prior knowledge of motion characteristics of the object.

12. The system as claimed in claim 11, wherein:
a kernel is a block with a tunable bandwidth.

13. The system as claimed in claim 11, further comprising:
encoding a region by including bandwidth parameters of the plurality of kernels so that it penalizes an appearance of pixels at large distances from kernels where a similar appearance occurs; and
using radially symmetric kernels.

14. The system as claimed in claim 12, wherein a bandwidth of a block depends on a reach of motion of an object.

15. The system as claimed in claim 12, wherein a spatial density of a candidate region is expressed as:

$$\hat{p}_u(y) = C_P \sum_{i=1}^{N} \delta[b(x_i) - u] \sum_{j=1}^{M} S_j^{(u)} k\left(\left\|\frac{x_i - y - \bar{z}_j}{h_j}\right\|^2\right);$$

and wherein $\bar{z}_j$ is the center of a block j and $h_j$ is the bandwidth of a block j.

16. The system as claimed in claim 15, wherein a mean shift vector is expressed as:

$$y^{(t+1)} = \frac{\sum_{i=1}^{N} w_i\left(\alpha_i^{(u_i,t)} x_i - v_i^{(u_i,t)}\right)}{\sum_{i=1}^{N} w_i \alpha_i^{(u_i,t)}};$$

and wherein $$\alpha_i^{(u,t)} = \sum_{j=1}^{M} \frac{1}{h_j^2} S_j^{(u)} C_{ij}^{(t)} \text{ and } v_i^{(u,t)} = \sum_{j=1}^{M} \frac{1}{h_j^2} S_j^{(u)} C_{ij}^{(t)} \bar{z}_j.$$

17. The system as claimed in claim 12, wherein the optimized bandwidth of a kernel is estimated by using motion capture.

18. The system as claimed in claim 12, wherein the object is articulated.

19. The system as claimed in claim 12, wherein the bandwidth of the plurality of kernels is determined by maximizing a functional of a class-separation metric.

20. The system as claimed in claim 12, wherein the bandwidth of the plurality of kernels is determined by maximizing a functional of a class-discrimination metric.

* * * * *